United States Patent
Aoyama (10) Patent No.: US 10,778,057 B2
(45) Date of Patent: Sep. 15, 2020

(54) ELECTRIC POWER TOOL

(71) Applicant: MAKITA CORPORATION, Anjo-shi, Aichi (JP)

(72) Inventor: Kiyoshi Aoyama, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 554 days.

(21) Appl. No.: 15/582,902

(22) Filed: May 1, 2017

(65) Prior Publication Data

US 2018/0013329 A1    Jan. 11, 2018

(30) Foreign Application Priority Data

Jul. 8, 2016   (JP) ................... 2016-136198

(51) Int. Cl.
| | |
|---|---|
| H02K 3/28 | (2006.01) |
| H02K 21/22 | (2006.01) |
| H02K 3/12 | (2006.01) |
| H02K 7/14 | (2006.01) |

(52) U.S. Cl.
CPC ............ *H02K 3/28* (2013.01); *H02K 3/12* (2013.01); *H02K 7/145* (2013.01); *H02K 21/22* (2013.01)

(58) Field of Classification Search
CPC .......... H02K 1/187; H02K 3/04; H02K 3/12; H02K 3/14; H02K 3/18; H02K 3/28; H02K 3/46; H02K 3/48; H02K 7/145
USPC ..................... 310/47, 50, 179–209
See application file for complete search history.

(56) References Cited

U.S. PATENT DOCUMENTS

| | | | | |
|---|---|---|---|---|
| 2011/0193444 | A1* | 8/2011 | Maruyama | H02K 3/522 310/215 |
| 2015/0303753 | A1* | 10/2015 | Huang | H02K 1/185 310/62 |
| 2017/0104398 | A1* | 4/2017 | Peng | H02K 3/28 |
| 2017/0310183 | A1* | 10/2017 | Jang | H02K 3/28 |
| 2017/0366115 | A1* | 12/2017 | Akutsu | H02P 27/06 |
| 2018/0248432 | A1* | 8/2018 | Ikeda | H02K 3/18 |

FOREIGN PATENT DOCUMENTS

| | | |
|---|---|---|
| JP | 2001-268833 A | 9/2001 |
| JP | 2009-148020 A | 7/2009 |
| JP | 2013-111734 A | 6/2013 |
| JP | 2016-093132 A | 5/2016 |
| JP | 2016-093133 A | 5/2016 |
| WO | 2017-073199 A1 | 5/2017 |

OTHER PUBLICATIONS

Mar. 17, 2020 Office Action issued in Japanese Patent Application No. 2016-136198.
May 19, 2020 Office Action issued in Chinese Patent Application No. 201710253142.2.

* cited by examiner

*Primary Examiner* — Quyen P Leung
*Assistant Examiner* — Minki Chang
(74) *Attorney, Agent, or Firm* — Oliff PLC (57) ABSTRACT

An electric power tool includes a brushless motor as a driving source. The brushless motor includes a stator and a rotor. The stator includes coils wound around in three phases. In a wire winding method of the coil of the stator, when the number of slots per phase is N, the number of series of the coils per phase is A, and the number of parallel of the coils per phase is B, a relation of N=A×B (note that, N is a natural number of 3 or more and 10 or less, A is a natural number of 1 or more, and B is a natural number of 2 or more) is satisfied.

5 Claims, 8 Drawing Sheets

| N | A | B |
|---|---|---|
| 3 | 1 | 3 |
| 4 | 2 | 2 |
|   | 1 | 4 |
| 5 | 1 | 5 |
| 6 | 3 | 2 |
|   | 2 | 3 |
|   | 1 | 6 |
| 7 | 1 | 7 |
| 8 | 4 | 2 |
|   | 2 | 4 |
|   | 1 | 8 |
| 9 | 3 | 3 |
|   | 1 | 9 |
| 10 | 5 | 2 |
|    | 2 | 5 |
|    | 1 | 10 |

ELECTRIC POWER TOOL

BACKGROUND

This application claims the benefit of Japanese Patent Application Number 2016-136198 filed on Jul. 8, 2016, the entirety of which is incorporated by reference.

TECHNICAL FIELD

The disclosure relates to an electric power tool that employs a brushless motor as a driving source.

RELATED ART

An electric power tool such as a chainsaw often employs a brushless motor that has a high durability compared with a commutator motor and is compact as a driving source. For example, Japanese Patent Application Publication No. 2016-93132 discloses such a brushless motor. In the brushless motor, wires are wound around teeth disposed on a stator in order to form coils of three phases and to be connected in a delta connection, and end portions of the wires between the respective phases are connected to a switching circuit constituted of a switching element. Further, in the brushless motor, a rotation detecting element is disposed on a sensor circuit board to detect a rotation position of a rotor, and a processing unit is disposed to obtain a detection signal so that the switching element performs a switching action via a gate driver corresponding to the rotation position, and then the rotor rotates. The stator in the brushless motor is configured such that coils formed on 12 teeth are connected in series by four in each phase.

In the brushless motor, in order to obtain a higher output as necessary, it is considered that a diameter of the wire to be wound around the stator is increased and the number of windings of the coil is decreased. However, when a wire with a large diameter is employed, several problems occur. For example, productivity is decreased. Further, a useless space in the slot is increased and a so-called space factor is reduced, which results in degradation of motor performance. Further, when the stator with a large number of slots is used, parts where crossover wires overlap one another between the coils are increased, and thus, possibility of damage on an insulating coating due to vibrations is increased and downsizing may be inhibited due to bulging outward.

Therefore, it is an object of the disclosure to provide an electric power tool configured to achieve a higher output of a brushless motor without increasing a wire diameter.

SUMMARY

In order to achieve the above-described object, there is provided an electric power tool that includes a brushless motor as a driving source. The brushless motor may include a rotor and a stator that includes coils wound around in three phases. In a wire winding method of the coil of the stator, when the number of slots per phase is N, the number of series of the coils per phase is A, and the number of parallel of the coils per phase is B, a relation of N=A×B (note that, N is a natural number of 3 or more and 10 or less, A is a natural number of 1 or more, and B may be a natural number of 2 or more) is satisfied.

It is preferable that the brushless motor is an outer rotor type where a cylindrical rotor is disposed on an outer periphery of the stator on which a plurality of teeth are radially disposed to protrude, and the coils are wound around the plurality of the teeth.

It is preferable that, in the wire winding method, the number N of the slots is four, the number A of the series is two, and the number B of parallel is two, and terminal wires of the coils of the respective phases are alternately led out with intervals of 60°.

It is preferable that the terminal wires of the coils are led out from between the teeth around which the coils are wound.

It is preferable that the stator includes a stator core and insulators, the stator core is made of a magnetic material and the teeth are disposed to protrude on the stator core, the insulators are each disposed on both end surfaces in an axial direction of the stator core, and the insulator includes a center portion that covers the end surface of the stator core and a radiate portion that covers the end surfaces of the teeth.

It is preferable that the center portion includes a pair of protrusions projecting from both sides of a base of the radiate portion and a ring-shaped rib positioned on an inner side of the protrusions, the protrusions and the rib are each disposed to protrude on the center portion, and crossover wires between the coils are led passing between the protrusions and through an outside of the rib.

It is preferable that the crossover wires between the coils are disposed only on an opposite connection side of the stator and intersect with one another.

It is preferable that, when the number A of the series is two or more, the crossover wires between the coils are wired alternately on both front and rear end surfaces in the axial direction of the stator without intersecting with one another.

It is preferable that the rotor has a closed bottom portion on which an axial fan is integrally formed.

It is preferable that the coil is formed of a wire whose wire diameter is φ0.8 mm.

It is preferable that the wire winding method of the coil of the stator employs a delta connection.

According to the disclosure, the coils of the respective phases are configured in A-series B-parallel. Therefore, resistance in the respective phases is decreased so that the higher output is achieved. Especially, since the wire diameter is decreased, the space factor in the slot between the teeth can be maintained, and further, the outward bulging is reduced even when the winding number is increased. Therefore, the downsizing is maintained.

DETAILED DESCRIPTION

The following describes embodiments of the disclosure based on the drawings.

Figure 1:
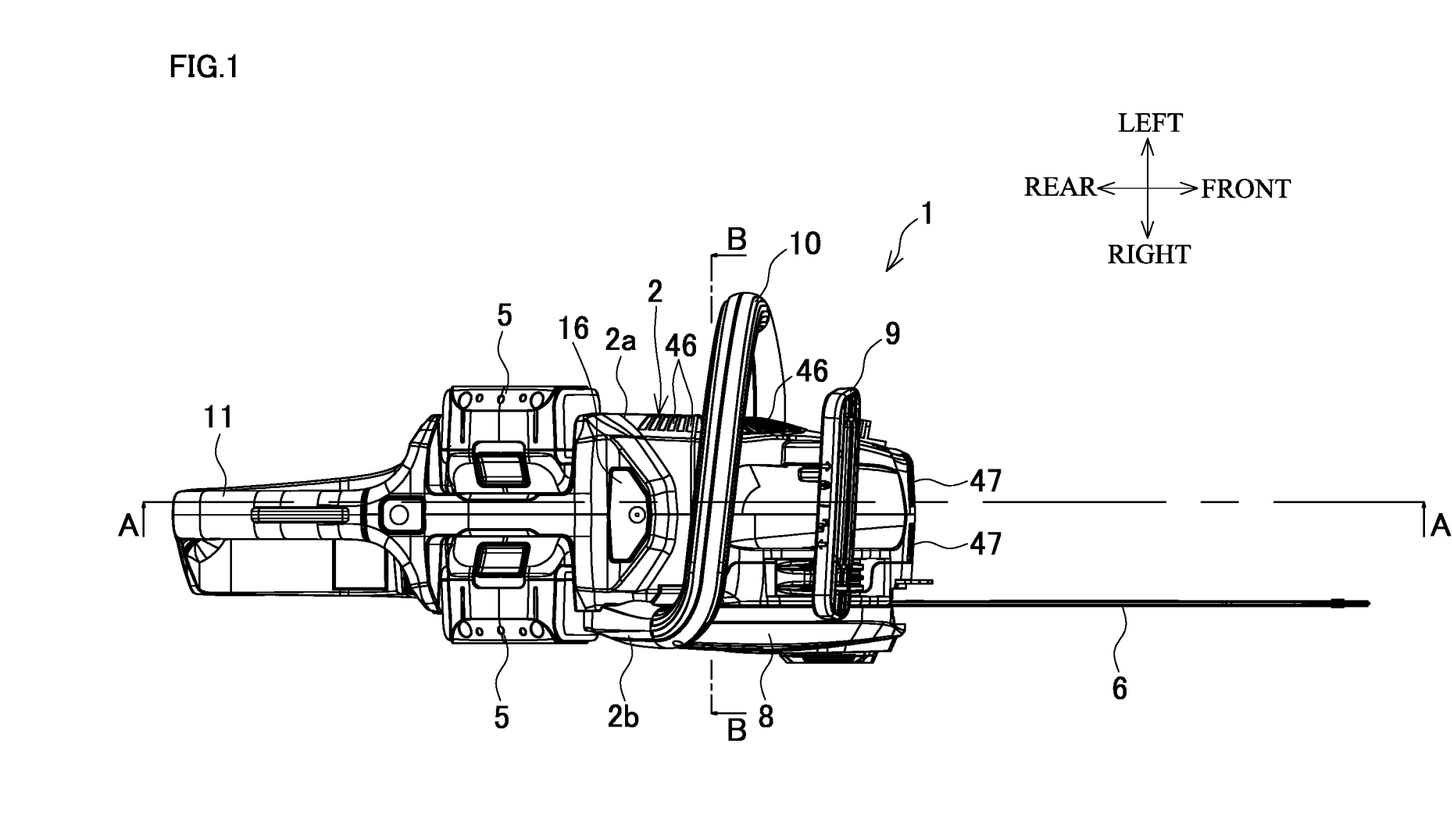
FIG. 1 is a plan view of a rechargeable chainsaw.
Figure 2:
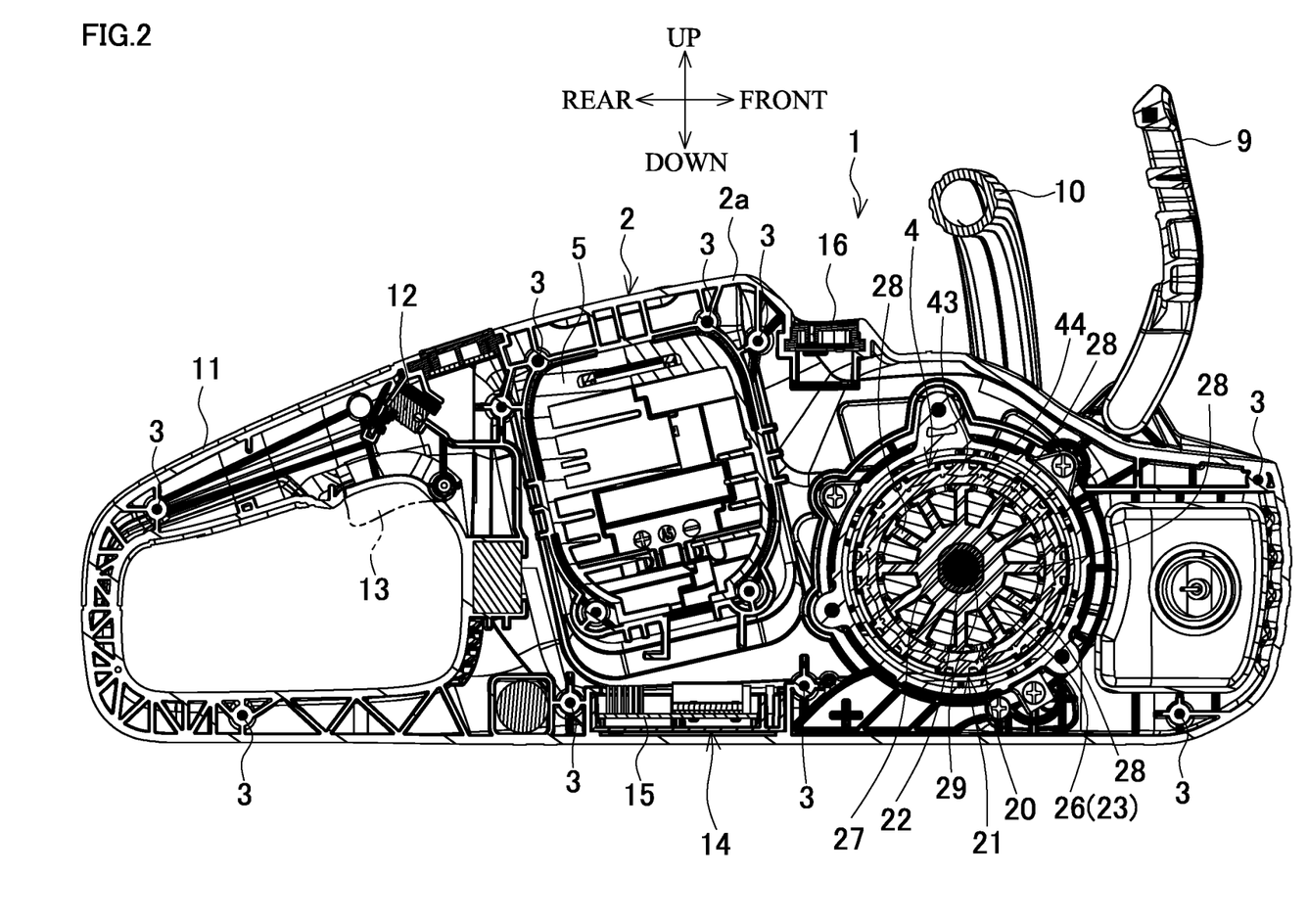
FIG. 2 is an enlarged cross-sectional view taken along the line A-A in FIG. 1.
Figure 3:
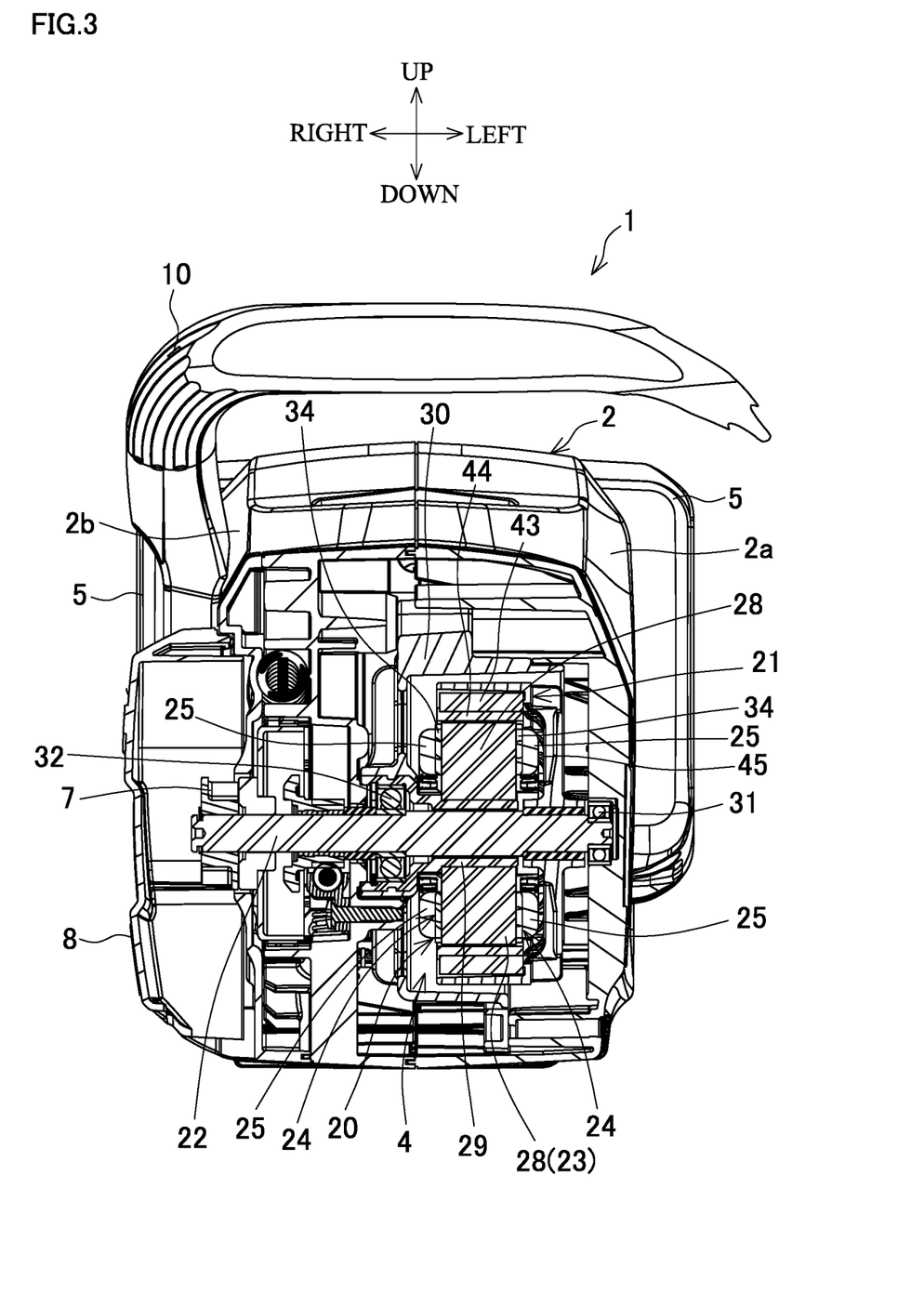
FIG. 3 is an enlarged cross-sectional view taken along the line B-B in FIG. 1.

FIG. 1 is a plan view illustrating a rechargeable chainsaw (hereinafter simply referred to as "a chainsaw") as an exemplary electric power tool, FIG. 2 is an enlarged cross-sectional view taken along the line A-A, and FIG. 3 is an enlarged cross-sectional view taken along the line B-B. A chainsaw 1 includes a housing 2 formed of left and right half housings 2a and 2b assembled by a plurality of screws 3, 3 . . . , a brushless motor 4 housed sideways in a front portion of the housing 2, and a pair of battery packs 5, 5 removably installed on right and left of a rear portion of the housing 2. On a right side surface of the front portion of the housing 2, a guide bar 6 is disposed to project forward, and an endless saw chain (not illustrated) is tightly stretched between the guide bar 6 and a sprocket 7 disposed on a rotation shaft 22 of the brushless motor 4. A sprocket cover 8 covers a base portion of the guide bar 6 and the sprocket 7. A guard plate 9 is disposed on a top surface of the front portion of the housing 2, and a front handlebar 10 is disposed rear of the guard plate 9.

On the rear portion of the housing 2, a rear handlebar 11 formed in a rearwardly looped shape is disposed, and on an upper side of an inner periphery of the rear handlebar 11, a switch 12 and a trigger 13 that turns ON the switch 12 by a push-in operation are disposed. On a center portion of the housing 2 and downward of the battery packs 5, 5, a controller 14 is disposed to include a control circuit board 15. Ahead of the battery packs 5, 5 and on the top surface of the housing 2, a display unit 16 is disposed to indicate remaining capacities of the right and left battery packs 5, 5.

The brushless motor 4 is an outer rotor type that includes a rotor 21 on an outside of a stator 20 secured to the housing 2, and the rotor 21 is integrally rotatable with the rotation shaft 22 arranged in a right-left direction in the housing 2.

The stator 20 includes a stator core 23, insulators 24, 24, and a plurality of coils 25, 25 . . . . The stator core 23 is formed of a magnetic material, and constituted of a cylindrically-shaped base portion 26 with a through hole 27 chamfered with two parallel planes and a plurality of (here, 12 pieces) teeth 28, 28 . . . disposed to protrude radially from an outer periphery of the base portion 26. A support cylinder 29 passes through the through hole 27 of the base portion 26 with a shape identical to the through hole 27, so as to unrotatably support the stator core 23. The support cylinder 29 is held onto a center of a cup 30 that is assembled on the half housing 2a from the right side and has a shape of a cylinder with a closed bottom. The rotation shaft 22 is rotatably supported by a bearing 31 disposed on the half housing 2a and a bearing 32 disposed on the support cylinder 29.

Figure 4A:
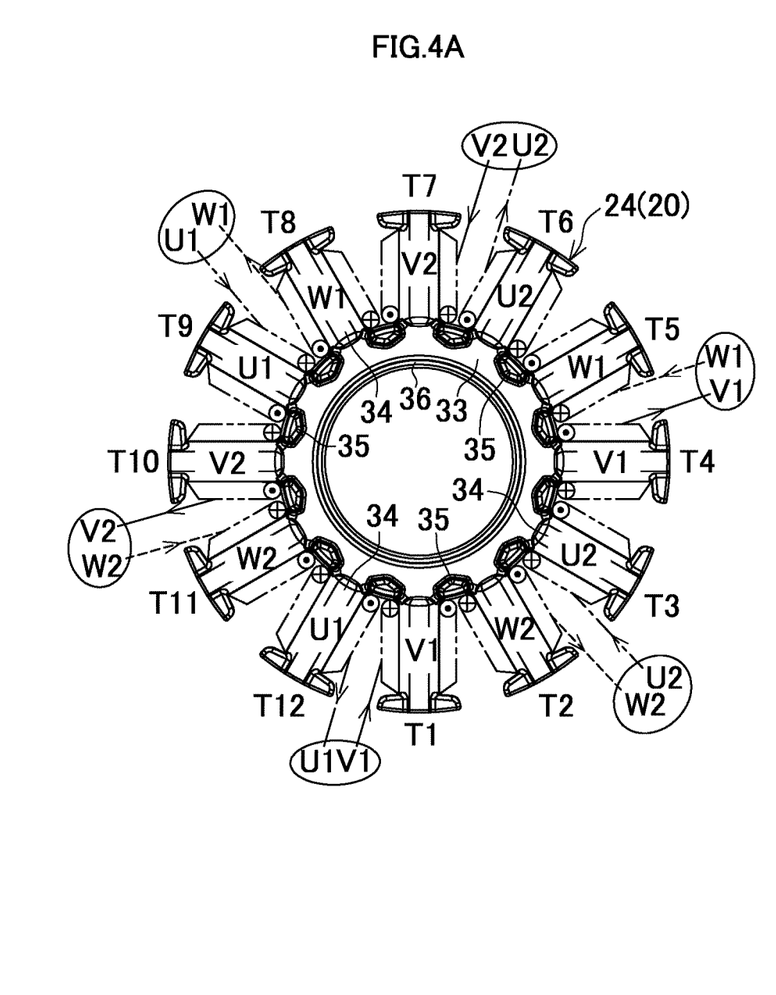
FIGS. 4A and 4B are explanatory views illustrating a wire winding method to a stator, and illustrate a connection side and an opposite connection side, respectively.
Figure 4B:
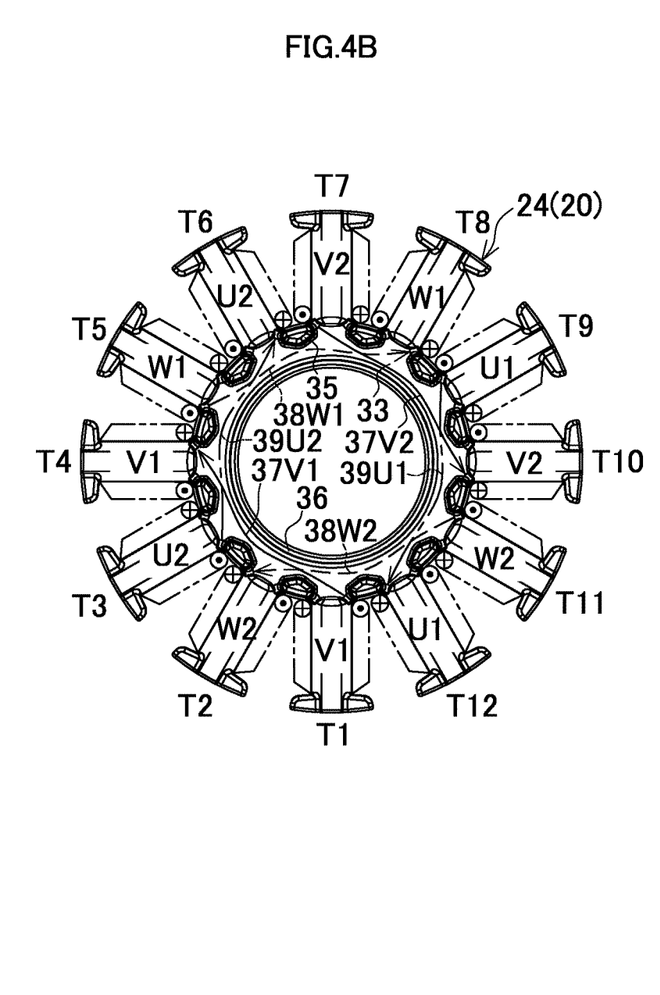

The insulator 24 is formed of a resin material, and as illustrated in FIGS. 4A and 4B, includes a ring-shaped center portion 33 and T-shaped radiate portions 34, 34 . . . . The ring-shaped center portion 33 covers an end surface of the base portion 26 of the stator core 23 except the through hole 27, and the T-shaped radiate portions 34, 34 . . . are continuously disposed to the center portion 33 to cover end surfaces of the respective teeth 28. The insulator 24 is disposed on both end surfaces of the stator core 23. The center portions 33 each include a plurality of pairs of protrusions 35, 35 that project from both sides of a base of the respective radiate portions 34 and a ring-shaped rib 36 that is positioned on an inner side of the protrusions 35, 35. The protrusions 35, 35 and the rib 36 are each disposed to protrude on the center portion 33.

The respective coils 25 are formed such that a wire is wound around the four teeth 28, 28 . . . of the stator core 23 so as to form each of a U-phase (U1-phase and U2-phase), a V-phase (V1-phase and V2-phase), and a W-phase (W1-phase and W2-phase). A wire winding method of the coils 25 in the respective phases of this embodiment will be schematically described with reference to the stator core 23 and the stator 20 in FIGS. 4A and 4B where reference numerals T1 to T12 are attached on the respective teeth 28. FIGS. 4A and 4B illustrate a connection side and an opposite connection side, respectively, and a + in circle indicate a winding direction of the wire toward a far side of the page and a black dot in circle indicate a winding direction of the wire toward a near side of the page.

First, the wire is wound around the teeth T1 (for example, 20 turns) on the connection side. Subsequently, a crossover wire 37 (hereinafter referred to as "a crossover wire 37V1" to distinguish the crossover wires in the respective phases one another, the same applies to the other phase) indicated by a solid line is passed from between the protrusions 35, 35 to the teeth T4 through the outside of the rib 36 on the opposite connection side. Then, the wire is wound around the teeth T4. Thus, two coils V1, V1 of the V1-phase indicated by two-dot chain lines are formed in series. A terminal end of the wire is led out from a slot between the teeth T4 and T5.

Next, the wire is wound around the adjacent teeth T5. Subsequently, a crossover wire 38W1 indicated by a dotted line is passed from between the protrusions 35, 35 to the teeth T8 through the outside of the rib 36 on the opposite connection side. Then, the wire is wound around the teeth T8. Thus, two coils W1, W1 of the W1-phase indicated by two-dot chain lines are formed in series. A terminal end of the wire is led out from a slot between the teeth T8 and T9.

Next, the wire is wound around the adjacent teeth T9. Subsequently, a crossover wire 39U1 indicated by a one-dot chain line is passed from between the protrusions 35, 35 to the teeth T12 through the outside of the rib 36 on the opposite connection side. Then, the wire is wound around the teeth T12. Thus, two coils U1, U1 of the U1-phase indicated by two-dot chain lines are formed in series. A terminal end of the wire is led out from a slot between the teeth T12 and T1.

Next, the wire is wound around the teeth T7. Subsequently, a crossover wire 37V2 indicated by a solid line is passed from between the protrusions 35, 35 to the teeth T10 through the outside of the rib 36 on the opposite connection side. Then, the wire is wound around the teeth T10. Thus, two coils V2, V2 of the V2-phase indicated by two-dot chain lines are formed in series. A terminal end of the wire is led out from a slot between the teeth T10 and T11.

Next, the wire is wound around the adjacent teeth T11. Subsequently, a crossover wire 38W2 indicated by a dotted line is passed from between the protrusions 35, 35 to the teeth T2 through the outside of the rib 36 on the opposite connection side. Then, the wire is wound around the teeth T2. Thus, two coils W2, W2 of the W2-phase indicated by two-dot chain lines are formed in series. A terminal end of the wire is led out from a slot between the teeth T2 and T3.

Next, the wire is wound around the adjacent teeth T3. Subsequently, a crossover wire 39U2 indicated by a one-dot chain line is passed from between the protrusions 35, 35 to the teeth T6 through the outside of the rib 36 on the opposite connection side. Then, the wire is wound around the teeth T6. Thus, two coils U2, U2 of the U2-phase indicated by two-dot chain lines are formed in series. A terminal end of the wire is led out from a slot between the teeth T6 and T7.

Then, on the connection side, a starting end of the wire of the V1-phase and the terminal end of the wire of the U1-phase are combined with each other in the slot between the teeth T1 and T12, and are bundled up by for example, a polyolefin tube to form a V1U1 wire.

Similarly, a starting end of the wire of the V2-phase and the terminal end of the wire of the U2-phase are combined with each other in the slot between the teeth T6 and T7, and are bundled up by, for example, a polyolefin tube to form a V2U2 wire.

Similarly, a starting end of the wire of the W1-phase and the terminal end of the wire of the V1-phase are combined with each other in the slot between the teeth T4 and T5, and are bundled up by, for example, a polyolefin tube to form a W1V1 wire.

Similarly, a starting end of the wire of the W2-phase and the terminal end of the wire of the V2-phase are combined with each other in the slot between the teeth T10 and T11, and are bundled up by, for example, a polyolefin tube to form a W2V2 wire.

Similarly, a starting end of the wire of the U1-phase and the terminal end of the wire of the W1-phase are combined with each other in the slot between the teeth T8 and T9, and are bundled up by, for example, a polyolefin tube to form a U1W1 wire.

Similarly, a starting end of the wire of the U2-phase and the terminal end of the wire of the W2-phase are combined with each other in the slot between the teeth T2 and T3, and are bundled up by, for example, a polyolefin tube to form a U2W2 wire.

In thus formed six terminal wires, the V1U1 wire is led out from between the teeth T1 and T12, the V2U2 wire is led out from between the teeth T6 and T7, the W1V1 wire is led out from between the teeth T4 and T5, the W2V2 wire is led out from between the teeth T10 and T11, the U1W1 wire is led out from between the teeth T8 and T9, and the U2W2 wire is led out from between the teeth T2 and T3. The six terminal wires are each led out from the stator 20 with intervals of 60° such that the terminal wires in an identical phase are led out with intervals of 180°.

Figure 5:
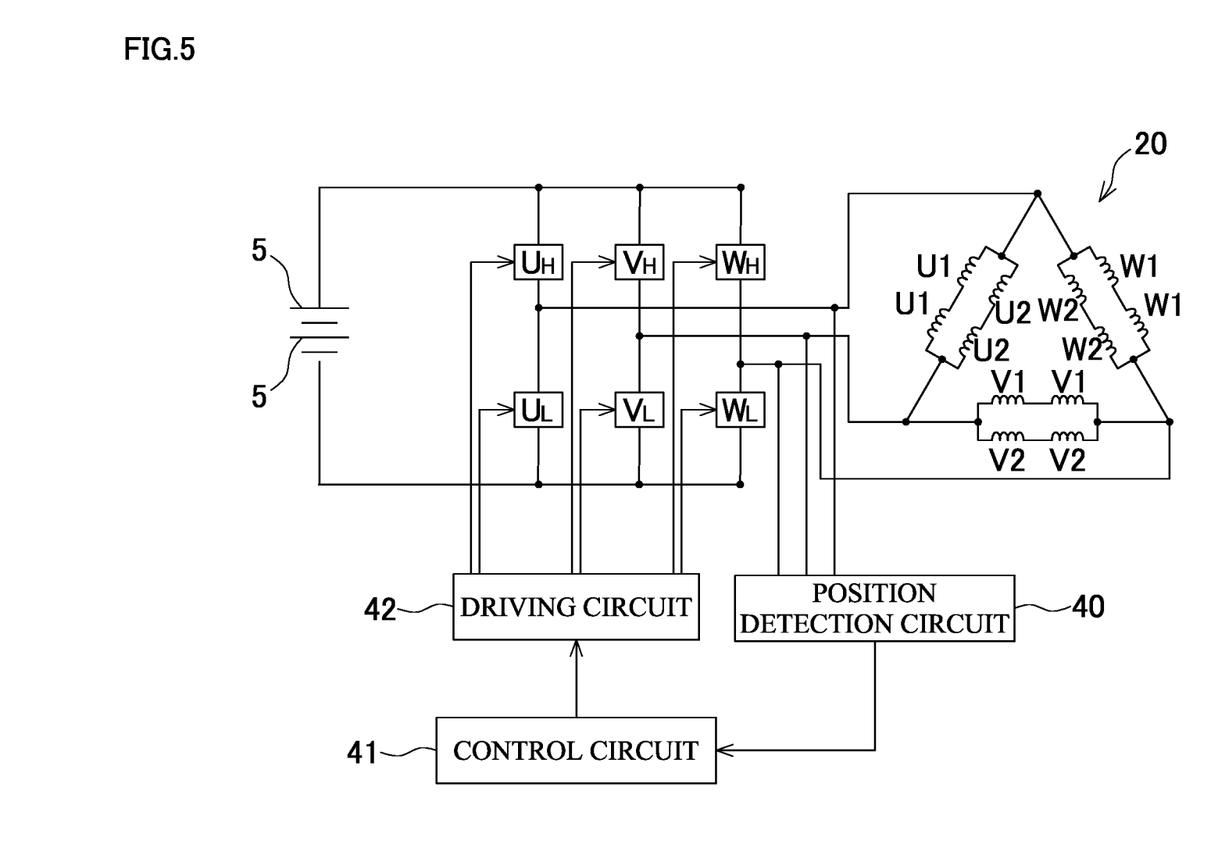
FIG. 5 is a circuit diagram of a control system of a brushless motor.

FIG. 5 is a circuit diagram of a control system of the brushless motor 4 by the control circuit board 15, and the terminal wires of the stator 20 are connected to a switching circuit constituted of six switching elements for switching voltages of the respective phases. Specifically, the U1W1 wire and the U2W2 wire are connected to between switching elements $U_H$ and $U_L$, the V1U1 wire and the V2U2 wire are connected to between switching elements $V_H$ and $V_L$, and the W1V1 wire and the W2V2 wire are connected to between switching elements $W_H$ and $W_L$.

Accordingly, the wire winding method described above uses a delta connection where four coils 25 in each phase are connected in two-series two-parallel. In FIG. 5, a position detection circuit 40 detects a rotation position of the rotor 21 based on induced electric powers of the coils 25 in each phase. A control circuit 41 is constituted of, for example, a microcomputer, and a driving circuit 42 is a driving circuit for the respective switching elements $U_H$, $U_L$ .... The control circuit 41 obtains a rotation position detection signal from the position detection circuit 40, so that the respective switching elements $U_H$, $U_L$ ... performs an ON/OFF action via the driving circuit 42.

The rotor 21 has a shape of a cylinder with a closed bottom and is coaxially fixedly secured to the rotation shaft 22 to cover the stator 20 from the left side. On the outside of the coil 25, a tubular rotor core 43 formed of a laminated steel plate is disposed, and on an inner periphery of the rotor core 43, a cylindrical magnet 44 is disposed to be magnetized such that an N-pole and an S-pole alternately appear.

On the closed bottom portion of the rotor 21, an axial fan 45 is integrally formed, so that air suctioned from air intake openings 46, 46 (FIG. 1) that is disposed on the left side surface of the housing 2 is discharged from exhaust outlets 47, 47 (FIG. 1) that is disposed on the front surface of the housing 2. Therefore, the air passes between the stator 20 and the rotor 21 and the brushless motor 4 can be cooled.

A right end portion of the rotation shaft 22 passes through the half housing 2b on the right side and projects into the sprocket cover 8. The sprocket 7 is coaxially fixedly secured to a distal end of the right end portion of the rotation shaft 22.

According to the chainsaw 1 configured as described above, when the trigger 13 is pushed in to turn on the switch 12, the power source of the battery packs 5, 5 is supplied to the coils 25, 25 . . . of the stator 20 of the brushless motor 4, and the rotor 21 rotates. That is, the control circuit 41 of the controller 14 causes the switching elements $U_H$, $U_L$ ... to perform the switching action via the driving circuit 42 based on the rotation position of the rotor 21 obtained from the position detection circuit 40, so that the coils 25 of the three phases are energized in order, and thus, the rotor 21 rotates.

The rotation of the rotor 21 integrally rotates the rotation shaft 22 to rotate the sprocket 7, so as to rotate the saw chain along the outer periphery of the guide bar 6, thus cutting a material to be cut.

According to the chainsaw 1 of the above embodiment, in the wire winding method of the coils 25 of the stator 20, the respective phases of four slots include two-series two-parallel such that a relation of N=A×B (note that, N is a natural number of 3 or more and 10 or less, A is a natural number of 1 or more, and B is a natural number of 2 or more) is satisfied when the number of slots per phase is N, the number of series of the coils 25 per phase is A, and the parallel number of the coils 25 per phase is B. Therefore, resistance of the respective phases is decreased and the higher output is achieved. Especially, since the wire diameter is decreased (for example, decreased to φ0.8 from conventional φ1.3), the space factor in the slot between the teeth 28, 28 can be maintained, and further, the outward bulging is reduced even when the winding number is increased. Therefore, the downsizing is maintained.

Figure 6A:
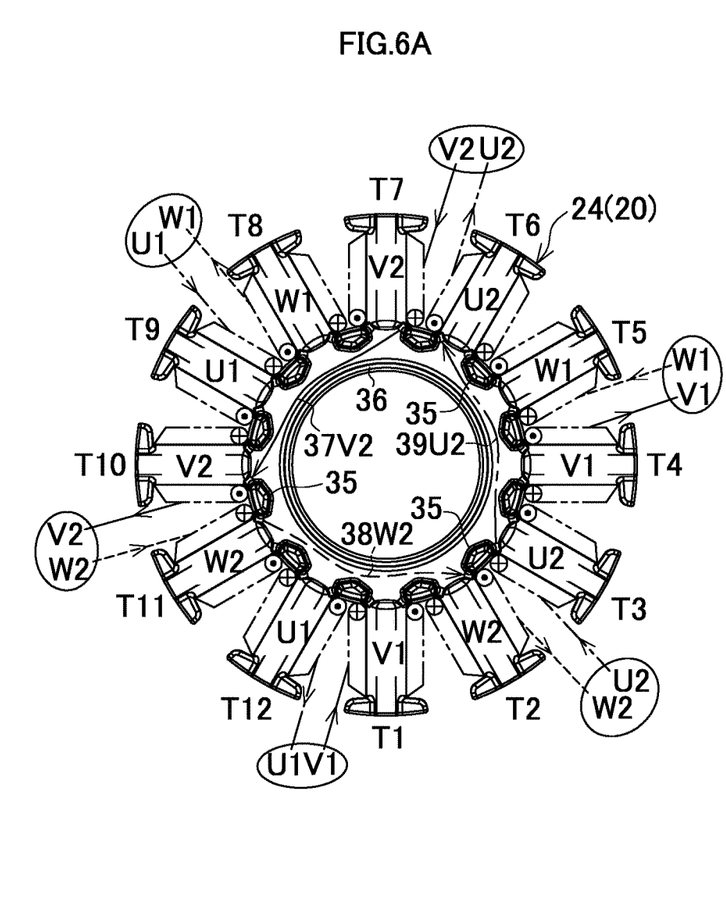
FIGS. 6A and 6B are explanatory views illustrating a modification example of the wire winding method, and illustrate the connection side and the opposite connection side, respectively.
Figure 6B:
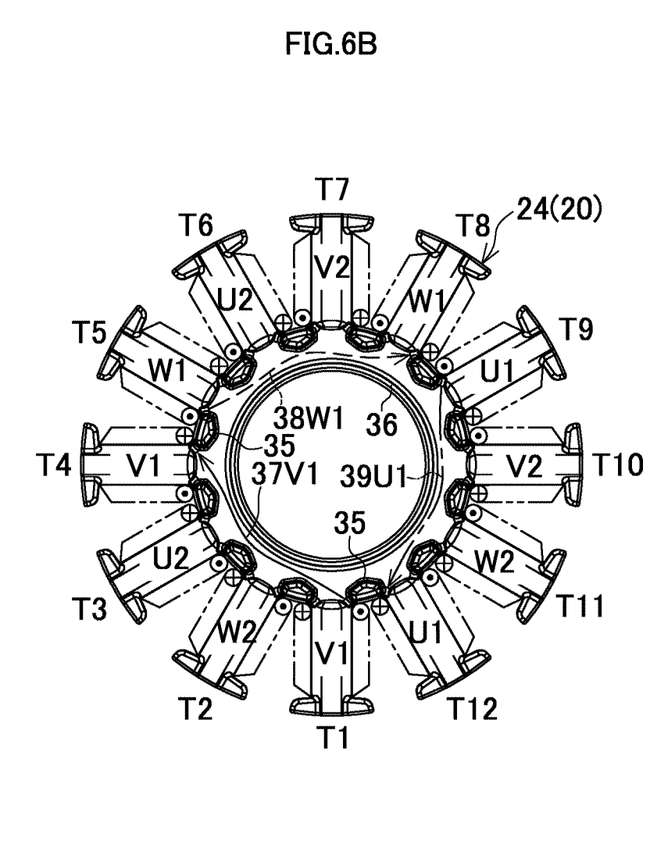

In the above embodiment, the crossover wires 37 to 39 intersect with one another because the crossover wires 37 to 39 between the coils 25, 25 of the respective phases of the stator 20 are disposed only on the opposite connection side. However, a wire winding method where the crossover wires do not intersect with one another can be employed. The following describes the wire winding method by referring to FIGS. 6A and 6B. Here, again, FIG. 6A illustrates the connection side, and FIG. 6B illustrates the opposite connection side.

First, the wire is wound around the teeth T1 (for example, 20 turns). Subsequently, the crossover wire 37V1 indicated by a solid line is passed from between the protrusions 35, 35 to the teeth T4 through the outside of the rib 36 on the opposite connection side. Then, the wire is wound around the teeth T4. Thus, two coils V1, V1 of the V1-phase indicated by two-dot chain lines are formed in series. A terminal end of the wire is led out from a slot between the teeth T4 and T5.

Next, the wire is wound around the adjacent teeth T5. Subsequently, the crossover wire 38W1 indicated by a dotted line is passed from between the protrusions 35, 35 to the teeth T8 through the outside of the rib 36 on the opposite connection side. Then, the wire is wound around the teeth T8. Thus, two coils W1, W1 of the W1-phase indicated by two-dot chain lines are formed in series. A terminal end of the wire is led out from a slot between the teeth T8 and T9.

Next, the wire is wound around the adjacent teeth T9. Subsequently, the crossover wire 39U1 indicated by a one-dot chain line is passed from between the protrusions 35, 35 to the teeth T12 through the outside of the rib 36 on the opposite connection side. Then, the wire is wound around the teeth T12. Thus, two coils U1, U1 of the U1-phase indicated by two-dot chain lines are formed in series. A terminal end of the wire is led out from a slot between the teeth T12 and T1.

Next, the wire is wound around the teeth T7. Subsequently, the crossover wire 37V2 indicated by a solid line is passed from between the protrusions 35, 35 to the teeth T10 through the outside of the rib 36 on the connection side. Then, the wire is wound around the teeth T10. Thus, two coils V2, V2 of the V2-phase indicated by two-dot chain lines are formed in series. A terminal end of the wire is led out from a slot between the teeth T10 and T11.

Next, the wire is wound around the adjacent teeth T11. Subsequently, the crossover wire 38W2 indicated by a dotted line is passed from between the protrusions 35, 35 to the teeth T2 through the outside of the rib 36 on the connection side. Then, the wire is wound around the teeth T2. Thus, two coils W2, W2 of the W2-phase indicated by two-dot chain lines are formed in series. A terminal end of the wire is led out from a slot between the teeth T2 and T3.

Next, the wire is wound around the adjacent teeth T3. Subsequently, the crossover wire 39U2 indicated by a one-dot chain line is passed from between the protrusions 35, 35 to the teeth T6 through the outside of the rib 36 on the connection side. Then, the wire is wound around the teeth T6. Thus, two coils U2, U2 of the U2-phase indicated by two-dot chain lines are formed in series. A terminal end of the wire is led out from a slot between the teeth T6 and T7.

Then, on the connection side, a starting end of the wire of the V1-phase and the terminal end of the wire of the U1-phase are combined with each other in the slot between the teeth T1 and T12, and bundled up by, for example, a polyolefin tube to form a V1U1 wire.

Similarly, a starting end of the wire of the V2-phase and the terminal end of the wire of the U2-phase are combined with each other in the slot between the teeth T6 and T7, and are bundled up by, for example, a polyolefin tube to form a V2U2 wire.

Similarly, a starting end of the wire of the W1-phase and the terminal end of the wire of the V1-phase are combined with each other in the slot between the teeth T4 and T5, and are bundled up by, for example, a polyolefin tube to form a W1V1 wire.

Similarly, a starting end of the wire of the W2-phase and the terminal end of the wire of the V2-phase are combined with each other in the slot between the teeth T10 and T11, and are bundled up by, for example, a polyolefin tube to form a W2V2 wire.

Similarly, a starting end of the wire of the U1-phase and the terminal end of the wire of the W1-phase are combined with each other in the slot between the teeth T8 and T9, and are bundled up by, for example, a polyolefin tube to form a U1W1 wire.

Similarly, a starting end of the wire of the U2-phase and the terminal end of the wire of the W2-phase are combined with each other in the slot between the teeth T2 and T3, and are bundled up by, for example, a polyolefin tube to form a U2W2 wire.

In thus formed six terminal wires, the V1U1 wire is led out from between the teeth T1 and T12, the V2U2 wire is led out from between the teeth T6 and T7, the W1V1 wire is led out from between the teeth T4 and T5, the W2V2 wire is led out from between the teeth T10 and T11, the U1W1 wire is led out from between the teeth T8 and T9, and the U2W2 wire is led out from between the teeth T2 and T3. The six terminal wires are each led out from the stator 20 with intervals of 60° such that the terminal wires in an identical phase are led out with intervals of 180°.

Thus, the crossover wires 37 to 39 between the coils 25, 25 of the respective phases are wired alternately on the connection side and the opposite connection side. In the above configuration, the coils 25, 25 . . . are allowed to be wound around without the intersection of any crossover wires 37 to 39 with one another. Accordingly, on the crossover wires 37 to 39, the possibility of the insulating coating to be damaged due to the vibration is sharply decreased.

Figure 7A:
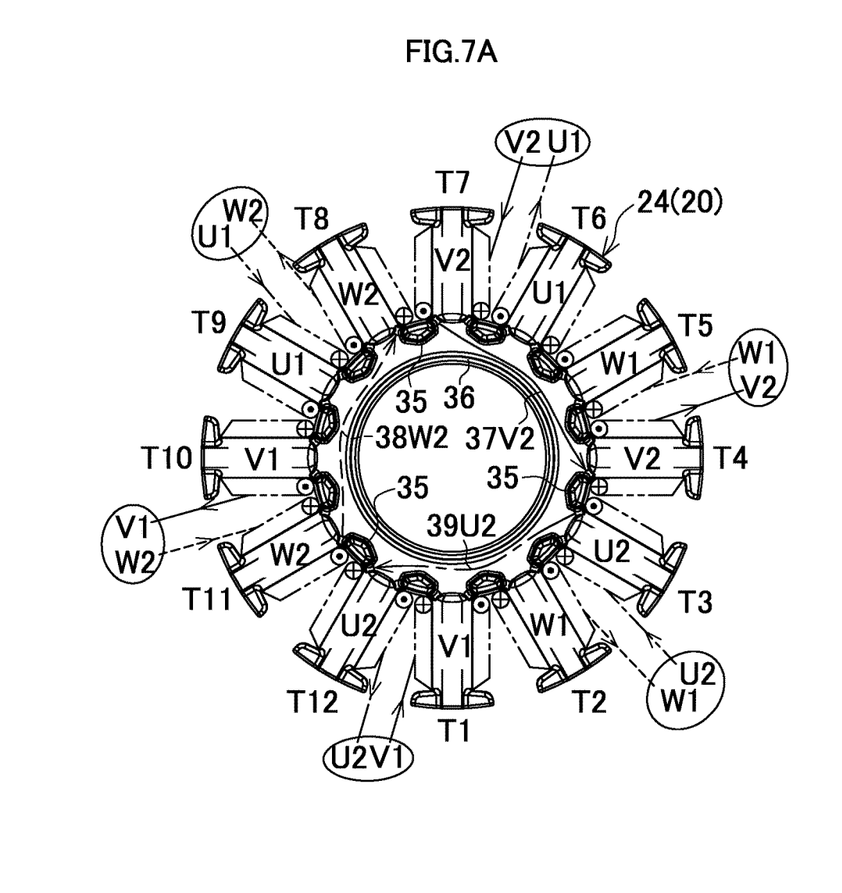
FIGS. 7A and 7B are explanatory views illustrating a modification example of the wire winding method, and illustrate the connection side and the opposite connection side, respectively.
Figure 7B:
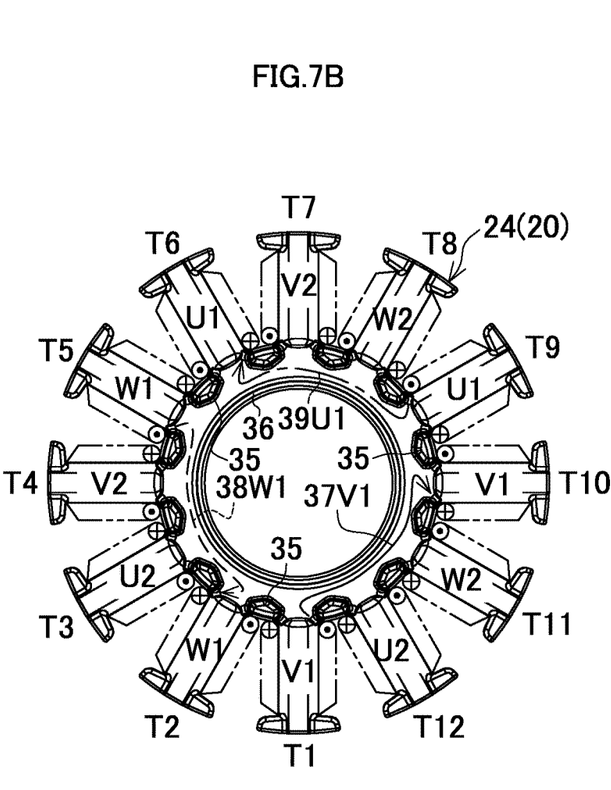

Next, another wire winding method where the crossover wires do not intersect with one another will be described by referring to FIGS. 7A and 7B.

First, the wire is wound around the teeth T1 (for example, 20 turns). Subsequently, the crossover wire 37V1 indicated by a solid line is passed from between the protrusions 35, 35 to the teeth T10 through the outside of the rib 36 on the opposite connection side. Then, the wire is wound around the teeth T10. Thus, two coils V1, V1 of the V1-phase indicated by two-dot chain lines are formed in series. A terminal end of the wire is led out from a slot between the teeth T10 and T11.

Next, the wire is wound around the teeth T5. Subsequently, the crossover wire 38W1 indicated by a dotted line is passed from between the protrusions 35, 35 to the teeth T2 through the outside of the rib 36 on the opposite connection side. Then, the wire is wound around the teeth T2. Thus, two coils W1, W1 of the W1-phase indicated by two-dot chain lines are formed in series. A terminal end of the wire is led out from a slot between the teeth T2 and T3.

Next, the wire is wound around the teeth T9. Subsequently, the crossover wire 39U1 indicated by a one-dot chain line is passed from between the protrusions 35, 35 to the teeth T6 through the outside of the rib 36 on the opposite connection side. Then, the wire is wound around the teeth T6. Thus, two coils U1, U1 of the U1-phase indicated by two-dot chain lines are formed in series. A terminal end of the wire is led out from a slot between the teeth T6 and T7.

Next, the wire is wound around the teeth T7. Subsequently, the crossover wire 37V2 indicated by a solid line is passed from between the protrusions 35, 35 to the teeth T4 through the outside of the rib 36 on the connection side. Then, the wire is wound around the teeth T4. Thus, two coils V2, V2 of the V2-phase indicated by two-dot chain lines are formed in series. A terminal end of the wire is led out from a slot between the teeth T4 and T5.

Next, the wire is wound around the teeth T11. Subsequently, the crossover wire 38W2 indicated by a dotted line is passed from between the protrusions 35, 35 to the teeth T8 through the outside of the rib 36 on the connection side.

Then, the wire is wound around the teeth T8. Thus, two coils W2, W2 of the W2-phase indicated by two-dot chain lines are formed in series. A terminal end of the wire is led out from a slot between the teeth T8 and T9.

Next, the wire is wound around the teeth T3. Subsequently, the crossover wire 39U2 indicated by a one-dot chain line is passed from between the protrusions 35, 35 to the teeth T12 through the outside of the rib 36 on the connection side. Then, the wire is wound around the teeth T12. Thus, two coils U2, U2 of the U2-phase indicated by two-dot chain lines are formed in series. A terminal end of the wire is led out from a slot between the teeth T12 and T1.

Then, on the connection side, a starting end of the wire of the V1-phase and the terminal end of the wire of the U2-phase are combined with each other in the slot between the teeth T1 and T12, and are bundled up by, for example, a polyolefin tube to form a V1U2 wire.

Similarly, a starting end of the wire of the V2-phase and the terminal end of the wire of the U1-phase are combined with each other in the slot between the teeth T6 and T7, and are bundled up by, for example, a polyolefin tube to form a V2U1 wire.

Similarly, a starting end of the wire of the W1-phase and the terminal end of the wire of the V2-phase are combined with each other in the slot between the teeth T4 and T5, and are bundled up by, for example, a polyolefin tube to form a W1V2 wire.

Similarly, a starting end of the wire of the W2-phase and the terminal end of the wire of the V1-phase are combined with in the slot between the teeth T10 and T11, and are bundled up by, for example, a polyolefin tube to form a W2V1 wire.

Similarly, a starting end of the wire of the U1-phase and the terminal end of the wire of the W2-phase are combined with each other in the slot between the teeth T8 and T9, and are bundled up by, for example, a polyolefin tube to form a U1W2 wire.

Similarly, a starting end of the wire of the U2-phase and the terminal end of the wire of the W1-phase are combined with each other in the slot between the teeth T2 and T3, and are bundled up by, for example, a polyolefin tube to form a U2W1 wire.

In thus formed six terminal wires, the V1U2 wire is led out from between the teeth T1 and T12, the V2U1 wire is led out from between the teeth T6 and T7, the W1V2 wire is led out from between the teeth T4 and T5, the W2V1 wire is led out from between the teeth T10 and T11, the U1W2 wire is led out from between the teeth T8 and T9, and the U2W1 wire is led out from between the teeth T2 and T3. The six terminal wires are each led out from the stator 20 with intervals of 60° such that the terminal wires in an identical phase are led out with intervals of 180°.

Even in this modification example, the crossover wires 37 to 39 between the coils 25, 25 of the respective phases are wired alternately on the connection side and the opposite connection side. In the above configuration, the coils 25, 25 . . . are allowed to be wound around without the intersection of any crossover wires 37 to 39 with one another. Accordingly, on the crossover wires 37 to 39, the possibility of the insulating coating to be damaged due to the vibration is sharply decreased.

Figure 8:
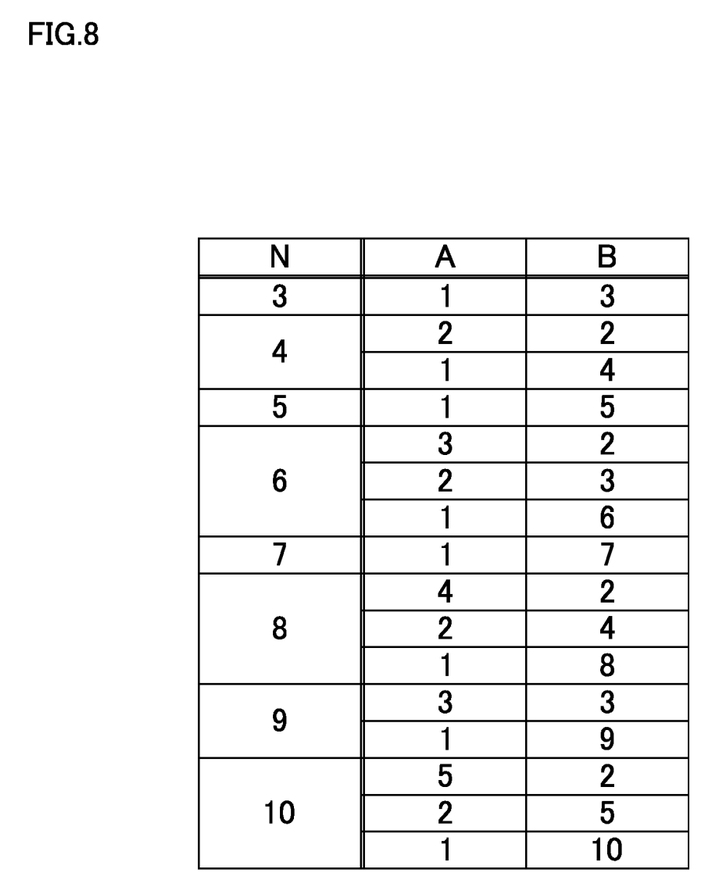
FIG. 8 is a table indicating combinations of the number of slots, the number of series, and the parallel number.

On the other hand, in the above embodiment and the modification examples, the number of slots of each phase is four, the number of series of the coils of each phase is two, and the parallel number of the coils of each phase is two. However, the disclosure is not limited to this, and the relation where the above-described N (the number of slots per phase)=A (the number of series of the coils per phase)×B (the parallel number of the coils per phase) is satisfied can be selected based on a table indicated in FIG. 8. For example, as the above embodiment, on a stator whose number N of slots per phase is four, a case where the number of series is one and the parallel number is four can be employed other than the case where the number of series is two and the parallel number is two.

Furthermore, while the wire winding method in the stator is the delta connection in the above embodiment, a Y-connection (star connection) is also applicable. The brushless motor may be an inner rotor type. Furthermore, for the detection of the rotation position of the rotor, a sensor circuit board that includes a rotation detecting element such as a Hall element may be employed instead of sensorless.

Then, the electric power tool is not limited to the chainsaw, and the disclosure is applicable to the other type of electric power tool such as a brushcutter and a caulking gun.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. An electric power tool comprising:
a brushless motor as a driving source, the brushless motor including a stator and a rotor, the stator including coils wound around in three phases, wherein
in a wire winding method of the coil of the stator, when the number of slots per phase is N, the number of series of the coils per phase is A, and the number of parallel of the coils per phase is B, a relation of N=A×B is satisfied,
N is a natural number of 3 or more and 10 or less, A is a natural number of 1 or more, and B is a natural number of 2 or more, and
when the number A of the series is two or more, crossover wires between the coils are wired alternately on both front and rear end surfaces of the stator in the axial direction of the stator without intersecting with one another.

2. The electric power tool according to claim 1, wherein:
in the wire winding method, the number N of the slots is four, the number A of the series is two, and the number B of parallel is two, and
terminal wires of the coils of the respective phases are alternately led out with intervals of 60°.

3. The electric power tool according to claim 2, wherein:
the stator includes a stator core and insulators, the stator core is made of a magnetic material and the teeth are disposed to protrude on the stator core, and the insulators are each disposed on both end surfaces in an axial direction of the stator core, and
the insulator includes a center portion that covers the end surface of the stator core and a radiate portion that covers the end surfaces of the teeth.

4. The electric power tool according to claim 3, wherein:
the center portion includes a pair of protrusions projecting from both sides of a base of the radiate portion and a ring-shaped rib positioned on an inner side of the protrusions, and the protrusions and the rib are each disposed to protrude on the center portion, and the crossover wires between the coils are led passing between the protrusions and through an outside of the rib.

5. The electric power tool according to claim 4, wherein the crossover wires between the coils are disposed only on an opposite connection side of the stator and intersect with one another.

\* \* \* \* \*